US008520559B2

(12) United States Patent
Rao et al.

(10) Patent No.: US 8,520,559 B2
(45) Date of Patent: Aug. 27, 2013

(54) METHOD FOR ROUTING VIA ACCESS TERMINALS

(75) Inventors: Sudarshan A Rao, Jayanagar (IN); Subramanian Vasudevan, Morristown, NJ (US)

(73) Assignee: Alcatel Lucent, Paris (FR)

( * ) Notice: Subject to any disclaimer, the term of this patent is extended or adjusted under 35 U.S.C. 154(b) by 92 days.

(21) Appl. No.: 12/286,417

(22) Filed: Sep. 30, 2008

(65) Prior Publication Data

US 2009/0252088 A1 Oct. 8, 2009

Related U.S. Application Data

(60) Provisional application No. 61/072,704, filed on Apr. 2, 2008.

(51) Int. Cl.
*H04B 7/14* (2006.01)
*H04W 4/00* (2009.01)

(52) U.S. Cl.
USPC .............................. 370/279; 370/315; 370/329

(58) Field of Classification Search
USPC ................. 370/252, 278, 281, 261, 331, 336, 370/310, 328, 342, 350, 356, 352, 337, 314, 370/330, 347, 321
See application file for complete search history.

(56) References Cited

U.S. PATENT DOCUMENTS

| 6,005,884 | A * | 12/1999 | Cook et al. ................... 375/132 |
| 6,608,823 | B1 | 8/2003 | Kito |
| 7,450,948 | B2 * | 11/2008 | Argyropoulos et al. ... 455/452.1 |
| 7,526,012 | B2 | 4/2009 | Shimizu et al. |
| 7,623,863 | B2 | 11/2009 | Chen et al. |
| 7,991,400 | B2 * | 8/2011 | Ito et al. ........................ 455/436 |
| 8,014,334 | B2 | 9/2011 | Lee et al. |
| 8,254,341 | B2 | 8/2012 | Seki |
| 2005/0192037 | A1 | 9/2005 | Nanda et al. |
| 2006/0036518 | A1 * | 2/2006 | O'Neill .......................... 705/30 |
| 2006/0120436 | A1 | 6/2006 | Komatsu |
| 2006/0178149 | A1 | 8/2006 | Kamat ......................... 455/445 |
| 2006/0221894 | A1 * | 10/2006 | Casaccia et al. ............. 370/328 |
| 2007/0060178 | A1 * | 3/2007 | Gorokhov et al. ........... 455/506 |
| 2009/0213806 | A1 * | 8/2009 | Ode ............................... 370/329 |
| 2009/0232019 | A1 * | 9/2009 | Gupta et al. ................. 370/252 |
| 2010/0056166 | A1 * | 3/2010 | Tenny .......................... 455/450 |

FOREIGN PATENT DOCUMENTS

| EP | 1 830 522 A1 | 9/2007 |
| EP | 1830522 A1 * | 9/2007 |
| JP | 4260228 A | 9/1992 |
| JP | 2005117247 A | 4/2005 |
| WO | W003101132 | 4/2003 |
| WO | 2004102891 A1 | 11/2004 |
| WO | PCT/US2009/001708 | 7/2009 |

OTHER PUBLICATIONS

Examiner's Office Letter issued in Japanese Patent Application No. 2011-513508; Inventor: Rao; Method for Backhaul Interference Management With Access Terminal Router; Dec. 13, 2012, pp. 1-7.

* cited by examiner

*Primary Examiner* — Kevin C Harper
*Assistant Examiner* — Samina Choudhry
(74) *Attorney, Agent, or Firm* — Wolff & Samson PC

(57) ABSTRACT

An access-terminal routing methodology is provided that may be used to enable a wireless, meshed backhaul between base stations using existing wireless-access resources (time, bandwidth, code-space, power), protocols, and base station infrastructure. Accordingly, the invention provides a means to extend the coverage of existing networks by adding standalone base stations without wired or specialized wireless backhaul.

16 Claims, 16 Drawing Sheets

METHOD FOR ROUTING VIA ACCESS TERMINALS

RELATED APPLICATION

This application claims priority pursuant to 35 U.S.C. Sec 119(e) to U.S. Provisional Application No. 61/072,704, filed Apr. 2, 2008, entitled METHOD FOR ROUTING VIA ACCESS TERMINALS, the subject matter thereof being fully incorporated by reference herein.

FIELD OF THE INVENTION

The invention is related to communication systems and more particularly to systems and methods for routing traffic in wireless communication systems.

BACKGROUND OF THE INVENTION

A traditional wireless access network consists of a number of base stations (access points) connected to a centralized controller (radio network controller/base station controller) using wired links (copper, co-axial cable, fiber). The radio network controllers are connected back to circuit-switches or packet-data routers which in turn connect to the wired telecommunications infrastructure (the core network). This traditional, hierarchical network is shown in FIG. 1.

In typical base station deployments in current networks, a wired connection is usually required from each base station to the controller and then onwards to the core network. In the vast majority of cases, these wired links are T1, E1, Ethernet or fiber links. In some rare cases, specialized dedicated line-of-sight microwave links are employed that use separate spectrum. Implementation of such dedicated backhaul connections is usually expensive. There may also be pairs of base stations in an existing network for which a dedicated backhaul connection can not be reliably or economically implemented. It is therefore worth considering alternative approaches to reducing backhaul costs. One such alternative is to somehow provision wireless backhaul links between the base stations themselves and thereby provide the backhaul communications path. Furthermore, it would be desirable not to dedicate separate spectrum and specialized equipment for such backhaul.

In the case of fault isolation and trouble-shooting of base-stations, techniques in current cellular networks rely on the ability of the network operators to correlate information from many diverse sources. Quite often, the back-haul connection is leased from third-party service providers. Many times, when a lack of service is detected from a base-station, the root-cause cannot be clearly isolated to the wired network or the base-station RF chain for several hours, if not longer. There is no other mechanism available today to log-in to affected base-stations remotely when a backhaul may be mal-functioning. A site visit is required by a technician to confirm or rule out a mal-functioning base-station. This very expensive site visit could be avoided if another mechanism were made available to diagnose base-stations remotely.

Further, the actual numbers of infrastructure nodes (base stations or access points) is likely to increase by a few orders of magnitude. Typically, each of the large service provider networks today consist of in excess of 50,000 cells sites at which base stations are located. It is not unrealistic to expect such numbers to grow by a factor of 100 to about 5 million. Such large number of base stations will be needed to ensure truly ubiquitous data coverage. It is also likely that many of these new access points cannot be easily supported with a wired backhaul to the core network.

SUMMARY OF INVENTION

To address the problems described in the Background section, the inventors disclose herein a methodology for routing packets via an access terminal (AT) between base stations (access points), using wireless technology.

In an exemplary embodiment, the access-terminal routing capability may be used to provide a wireless, meshed backhaul between base stations using existing wireless-access resources (time, bandwidth, code-space, power), protocols, and base station infrastructure. Thus, a means to extend the coverage of existing networks by adding standalone base stations without wired or specialized wireless backhaul is provided.

Essentially, with the methodology of the invention, an AT can serve as a "proxy router" when called upon to do so. The ability to use the AT to route packets between base-stations provides added flexibility to configure and control base-stations and also redundancy in case existing backhaul is congested or broken.

According to the invention, access terminal routing capability provides network integration and more efficient resource allocation in frequency division duplex (FDD) wireless systems, while keeping the access terminal cost and complexity low. Particular advantages of the invention approach are also realized in time division duplex (TDD) systems.

In another embodiment, an all-wireless network (with no wired or specialized wireless backhaul) may be realized where air-interface resources are shared in a dynamic manner between the access and backhaul functions (on-demand and as-needed) using a single set of access protocols. Several access terminals may be used concurrently to achieve high data-rate backhaul.

In a further embodiment, a service model is described whereby access terminal owners (customers of wireless network operators) negotiate use of their devices to provide connectivity services to network operators by linking base stations via their devices.

In a still further embodiment, new extensions to current EVDO air-interface standards that enable AT routing capability are provided. To enable the AT to communicate with different base-stations on uplink and downlink simultaneously, thereby allowing for wireless relay and mesh networking between base-stations via the AT, the current EVDO standards would be enhanced with additional air-interface resource (power control, time and frequency) management and coordination.

In a further embodiment, the AT routing and relaying capability provided by the invention may be extended to new OFDM based air-interface technologies being consider for $4^{th}$ generation cellular standards such as LTE; UMB and WiMAX.

The evolution of networks that allows for IP addressable base stations and IP addressable access terminals provides natural base for extending seamless IP routing between these network elements.

DETAILED DESCRIPTION OF THE INVENTION

Figure 1:
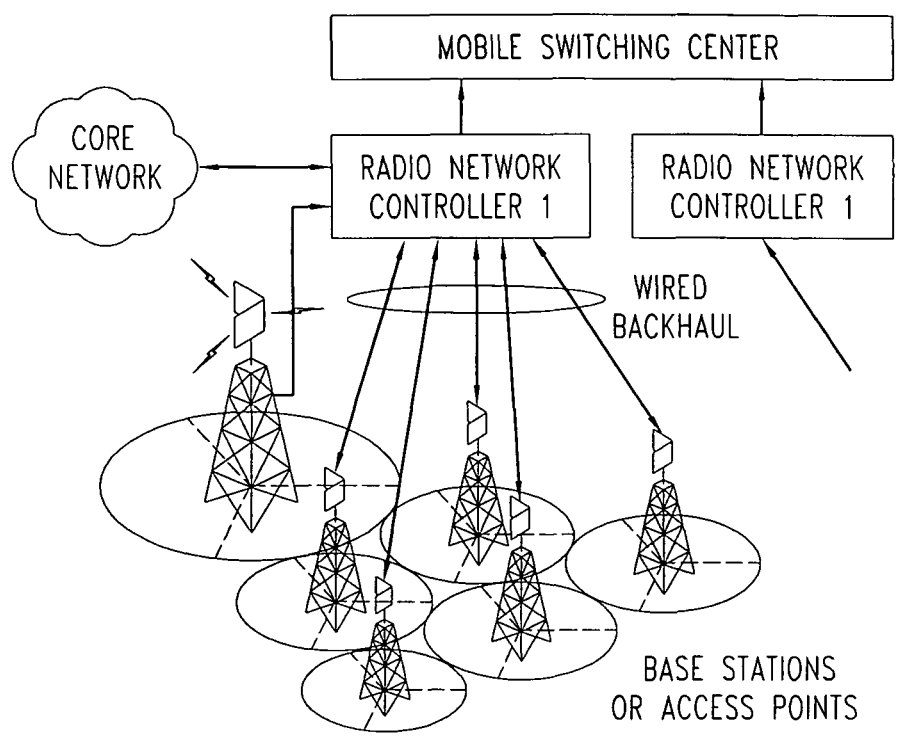
FIG. 1 provides a schematic illustration of an hierarchical wireless network
Figure 2:
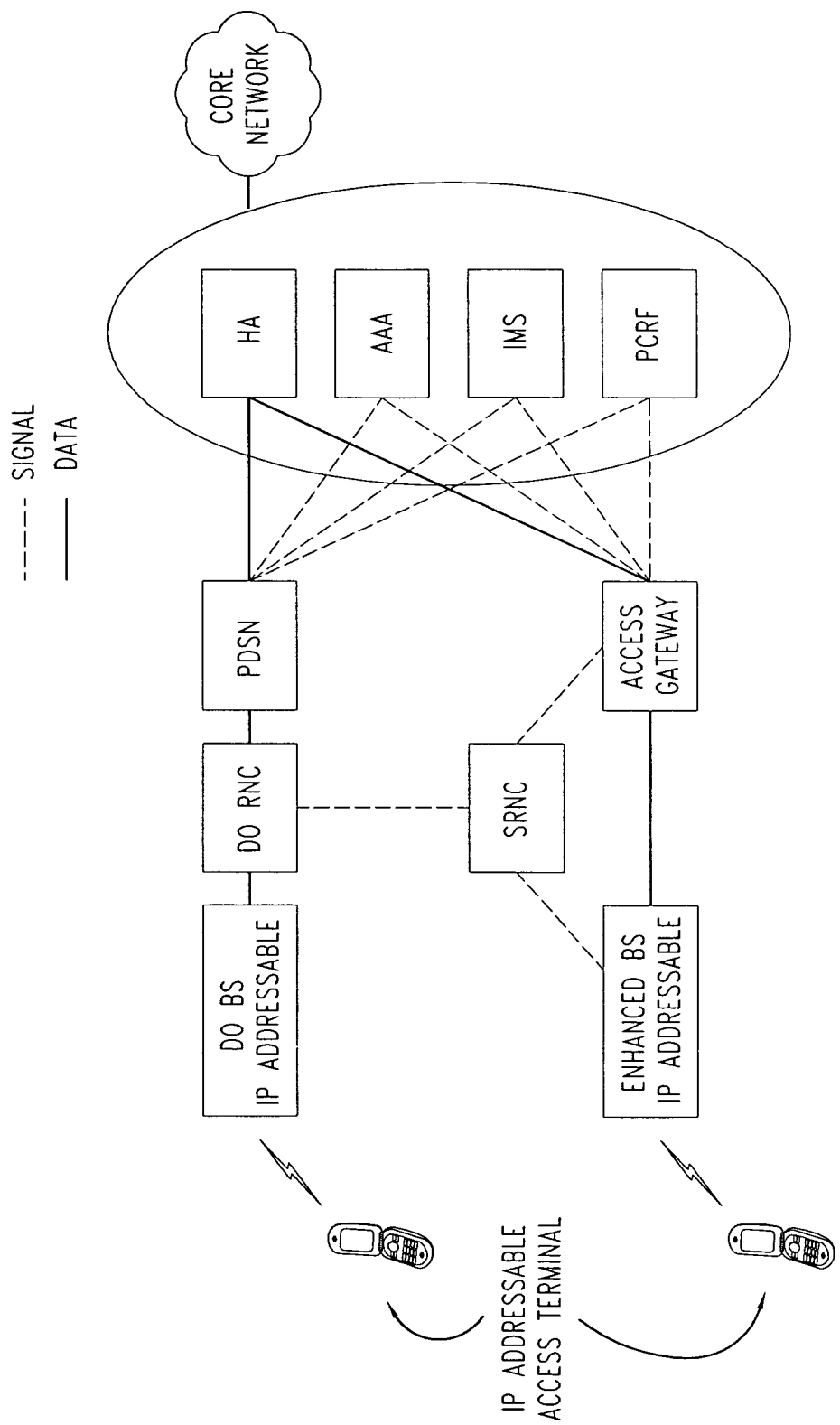
FIG. 2 schematically illustrates a packet data wireless access network

Wireless access networks are evolving towards packet-switching (as opposed to circuit switching) and end-to-end use of the Internet protocol. Such an evolved packet data wireless access network is shown in FIG. 2. The evolved access network consists of IP-addressable base stations connecting to the core packet data network via edge routers (known as gateways). The interfaces between the evolved base stations and the gateways are IP interfaces. Other signaling and control entities within the access network (that may either be integrated into the base stations or be stand-alone network elements) also use IP protocols.

Entities in the core network that support the operation of the access network include AAA servers and IMS (IP Multi-media sub-system) nodes to deliver multimedia services over the IP-based network. The top branch in FIG. 2 shows elements of EVDO networks that are currently deployed.

Concurrently the air-interface protocols between access terminals and base stations have also been evolving towards increasing use of packetization and the Internet protocol. Evolved access terminals are IP addressable and the evolved air-interface protocols support internet protocols between these access terminals and the base stations.

Figure 3:
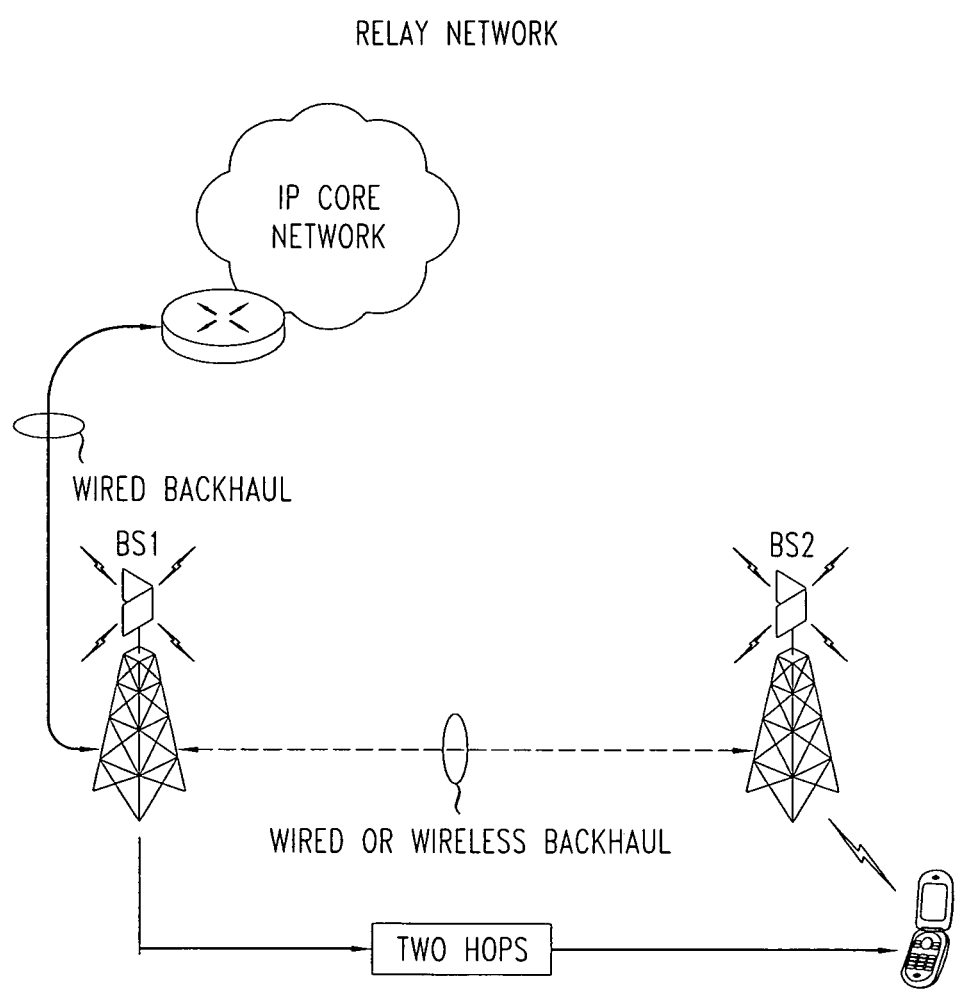
FIG. 3 illustrates a second base station acting as a relay for a first base station FIG. 4 schematically illustrates a 2-tier mesh network FIG. 5 schematically illustrates a flat 1-tier mesh network

Another direction in which access networks continue to evolve is towards supporting mesh/relay capability. A mesh network is one where the network nodes are connected (or can be connected) along multiple paths. A relay is specialized network equipment that transfers data over-the-air from one entity to the other (say a base station to an access terminal and vice-versa). FIG. 3 shows an example that depicts BS2 acting as a relay of BS1. Inter BS communication may be via a wired backhaul or a line-of-sight (LOS) microwave wireless link.

Figure 4:
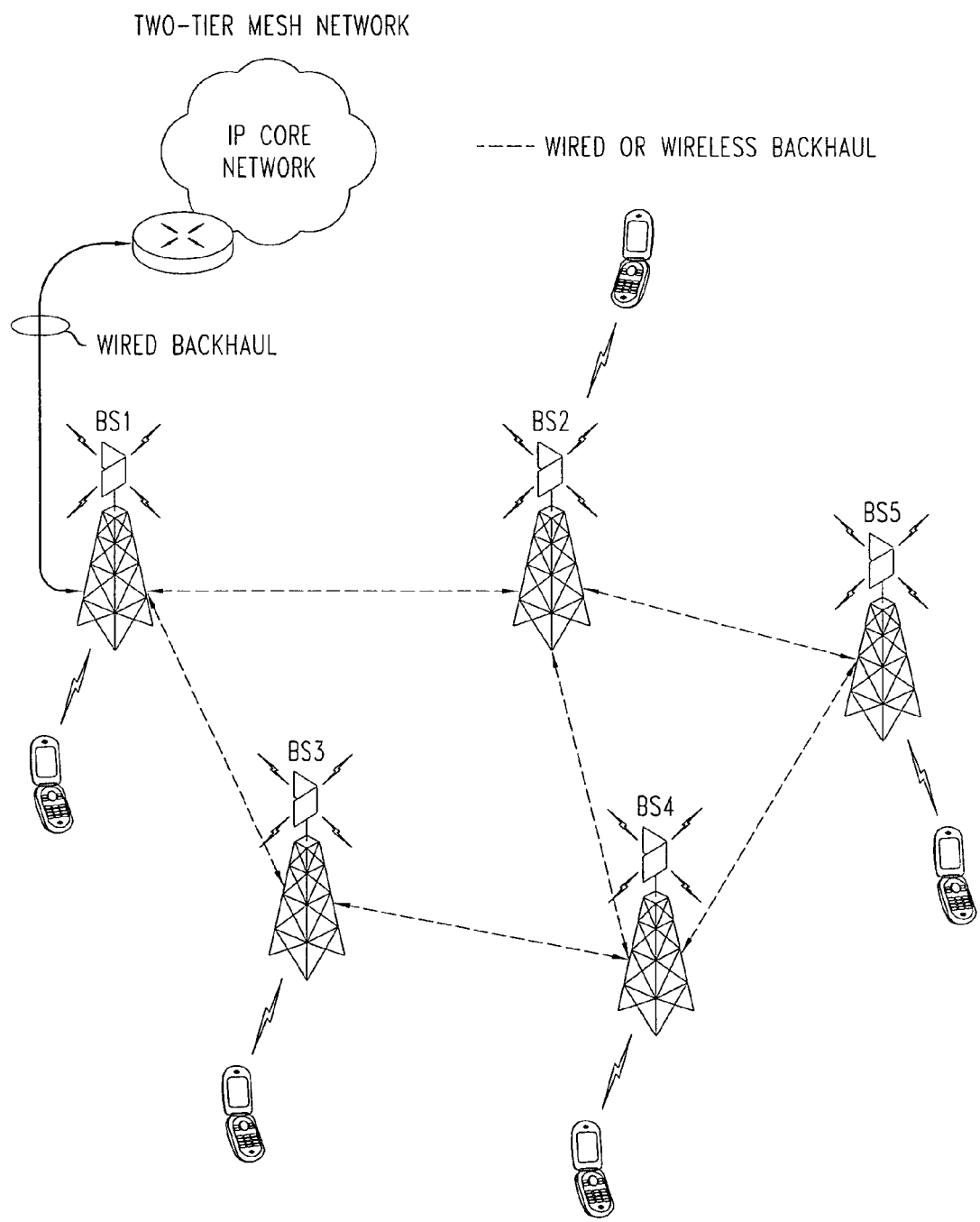
Figure 5:
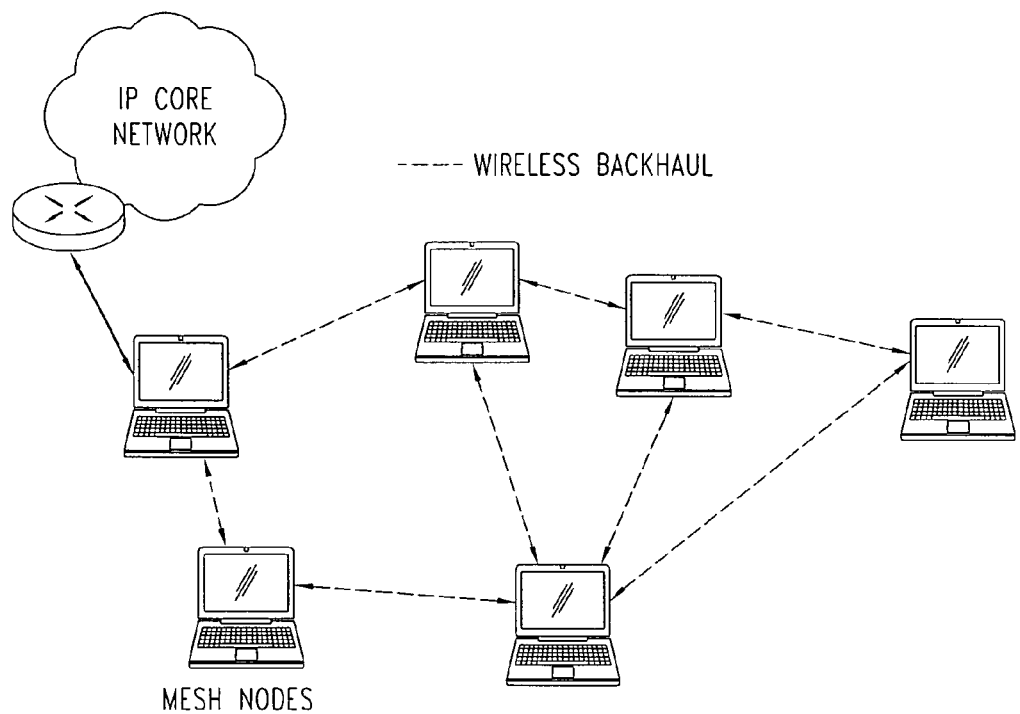

Mesh networks fall under two major categories: a 2-tier mesh network and a flat, 1-tier mesh network. In the 2-tier mesh network shown in FIG. 4, the first layer forms an interconnected set of mesh base stations. There are no changes to access terminals which continue to function in the normal mode. The access terminals do not have mesh capabilities. In the flat 1-tier mesh networks shown in FIG. 5, all terminals are capable of being a mesh node. There is no distinction between a base-station and an access terminal. Each node functions as both a base-station and an access terminal.

Wireless mesh and relay networks exist today as specified in IEEE 802 standards. These standards originated as extensions to the existing wireless LANs (802.11), wireless PANs (802.15) and in one case as an extension to wireless WAN (802.16). Integrating these 802 standards into existing, or emerging, cellular network standards such as UMB, EVDO, LTE etc as an overlay leads to a very difficult operational and network management undertaking. Such an integration would require complex multi-standard handsets, difficult hand-off protocols, and very complex interworking between various network elements that follow different standards.

The relevant portions of mesh/relay principles established in the IEEE 802 standards are hereafter briefly described for context and comparison.

The two main mechanisms for resource allocation for data and signaling transfer between the various network elements in 802 mesh/relay networks are: Carrier sense multiple access with collision avoidance (CSMA/CA) and time-division-multiplexing (TDM)/time-division-duplex (TDD).

CSMA/CA is simply a listen-before-you-transmit mechanism. Each mesh point or access terminal waits to make sure that the channel is not being used by other mesh points before transmitting. The CSMA/CA protocol specifies how to deal with any collisions in case two mesh points happen to transmit at the same time. The CSMA/CA has the advantage of resource allocation not being controlled from a centralized node leading to easy deployment. The downside is that the RF resources are inefficiently used.

In a TDD system, all the data and control is transferred on a single frequency. However, the time is divided into many small time-slots for scheduling and multiplexing (TDM) variable amounts of transmit and receive frames between various mesh/relay points. Typically, a centralized scheduler based resource allocation, either in base stations or special gateways, coordinates which network element transmits and receives at what time slots based on control information exchange between the various mesh points. The centralized resource management is simpler to implement, but slow and inefficient. Many distributed schemes, albeit much more complex, are under consideration as well.

Figure 6:
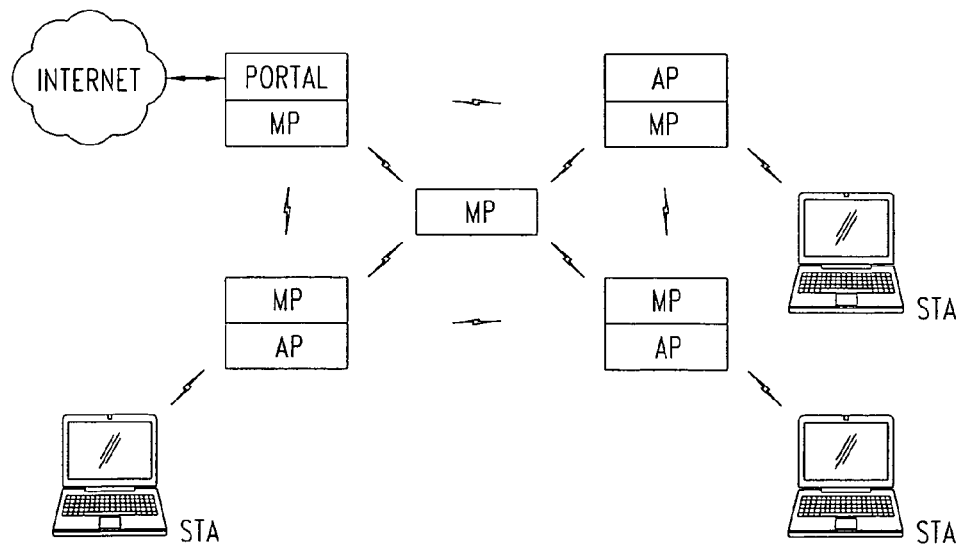
FIG. 6 shows the various network elements that form a mesh network in the 802.11s standard FIG. 7 provides a schematic depiction of an exemplary IEEE 802.16 based mesh network FIG. 8 provides a schematic depiction of a network provided under the 802.16j (Mobile Multi-hop Radio) standard FIG. 9 provides a schematic depiction of a network provided under the 802.15.x (Wireless Personal Area Networks) standard FIG. 10 schematically illustrates the operation of an access terminal according to the method of the invention.

The 802.11s standards integrate mesh networking and protocols as an extension to 802.11 WLAN MAC standards. FIG. 6 shows the various network elements that form a mesh network. The properties of those elements are outlined below.

- Mesh Point (MP): establishes peer-to-peer links with other MPs.
- Mesh Access Points (MAP=MP+AP): MP function co-located with Access Point (AP)
- Mesh Portal Points (MPP=MP+Portal): Gateway functionality of MP co-located with network element, or portal, where data enters and exits the mesh.
- STA (Stations): End user access terminals, which is outside of the mesh.
- The PHY and MAC layer communication between STA and MAP (MP+AP) remains unchanged (802.11a/b/g). The access mechanism remains CSMA/CA. The protocol relies on "listen before you send" mechanism—a collision avoidance scheme.
- The communication between MPs retain the same CSMA/CA paradigm of 802.11a/b/g. Additional LAYER 2 route discovery and forwarding specifications are specified in the MAC layer enhancements for MESH operation.
- Routing is based on HWMP (Hybrid Wireless Mesh Protocol) which is a hybrid of Radio Metric AODV (ad-hoc distance vector)+Tree based routing.
- Radio Aware OLSR (on-demand link state routing) is optional Throughput for 802.11s can be very low due to collision based access and data transfer mechanism.

Figure 7:
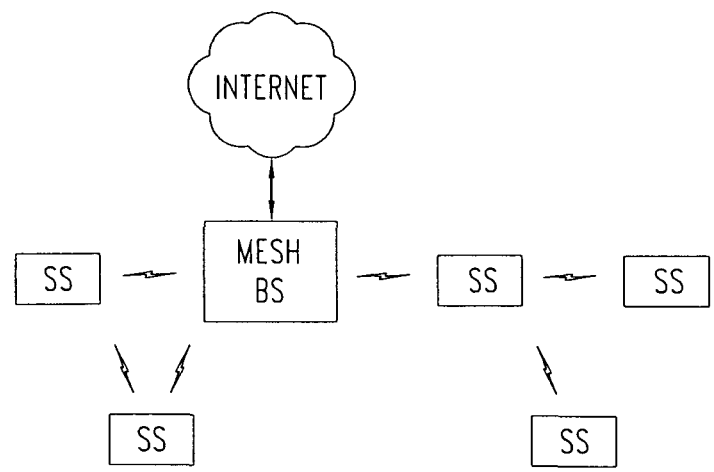

FIG. 7 shows an example of IEEE 802.16 based mesh network. The 802.16 mesh network consists of a Base Station (BS) and subscriber stations (SSs). The BS serves as a gateway to external network. Each SS can communicate with the BS and also with other SS.

The coordination function between mesh nodes (BS-to-SS and SS-SS) is scheduling based and slotted. Control and data are sent on the same channel, but using different time sub-frames. Both centralized and distributed scheduling mechanisms are specified in the standards to provide collision free transmission of control and data. In centralized scheduling, the mesh BS handles all the uplink (traffic goes from SSs to mesh BS) and downlink (traffic from mesh BS to SSs). In distributed scheduling, all SSs are peers and establish a handshaking protocol for reserving time slots to transmit between SSs. Slots are reserved by exchanging control messages between mesh nodes. TDD is used to share the channel between uplink and downlink. Each active mesh node (BS and SS) broadcasts network configuration advertisements. Any new SS that wishes to join the mesh scans for the advertised mesh network configuration messages. Upon selecting the appropriate mesh node to attach to (called a sponsor), it registers with the network via the sponsoring SS and becomes part of the mesh.

Figure 8:
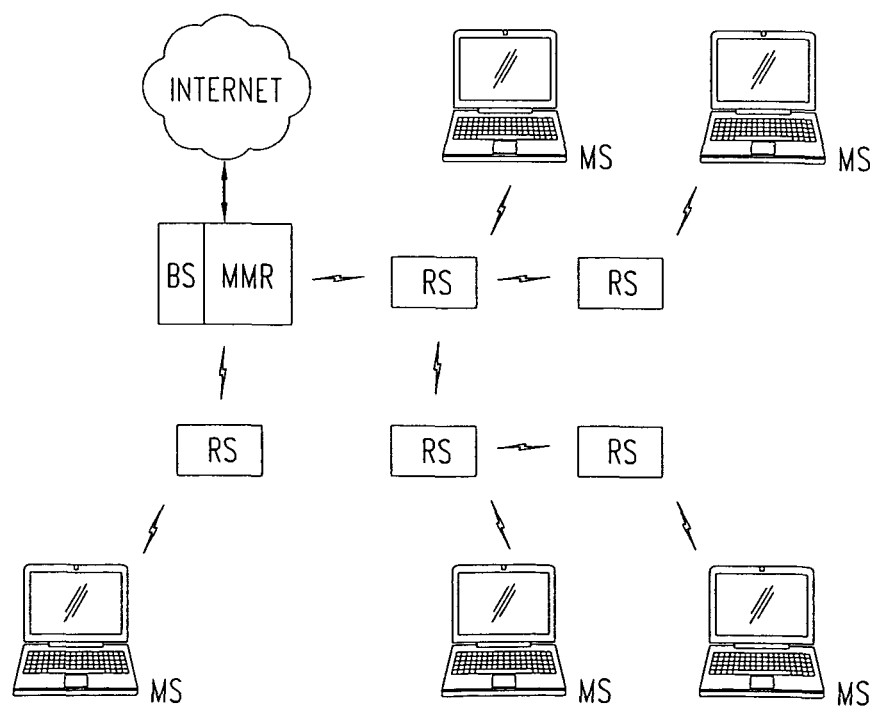

The 802.16j MMR (Mobile Multi-hop Radio) standard is primarily focused as a relay function extension to 802.16 standards and is depicted in FIG. 8. Properties of the elements of that configuration are outlined below.

- BS: Base Station, requiring an MMR enhancement is needed.
- RS: Relay Station. Acts as a BS to an MS and an MS to BS. Types of RS: Fixed (infrastructure), Nomadic (special events, indoor), Mobile (trains)
- MS/SS: Mobile Station/Subscriber station.
- Conventional 802.16 SS/MS only.
- Mobiles are outside the relay network.

Direct BS to MS communication uses the 802.16 TDD air interface standards with no changes. BS to RS communication is also based on TDD with TDM scheduling of downlink (DL) and uplink (UL). The time slots are divided further into control traffic and mesh traffic. Scheduling and routing messages are exchanged through the control segment time-slots before transmitting bearer data on mesh traffic time-slots.

RS to RS communication protocols also utilize the same mechanism as the BS to RS protocols. Centralized BS scheduling and routing is considered as the default option for easier implementation.

Figure 9:
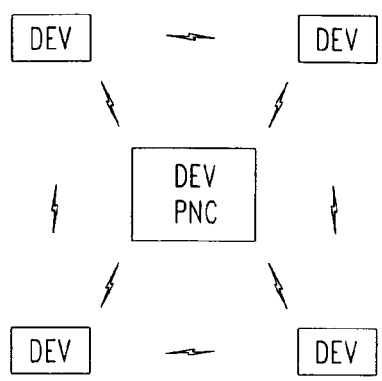

For 802.15.x WPANs (Wireless Personal Area Networks), three different variants of mesh/relay networks are in use and/or under development. All three have the basic device-to-device communication shown in FIG. 9. Those variants, with relevant properties, are outlined below.

- 802.15.1 Bluetooth-TDM, Master/Slave, not contention based
- 802.15.3 for high rate/high bandwidth applications-Ultra wide band (UWB) based.
- 802.15.4 for low rate sensor networks (like Zigbee).

In 802.15 PANs, the clients are both consumers and nodes of an ad hoc mesh network. The "routers" may be fixed or mobile. No infrastructure BS or AP is involved.

A wireless PAN PICONET, consists of several components. The basic component is the DEV (device). One DEV is required to assume the role of the piconet coordinator (PNC) of the piconet. The PNC provides the basic timing for the piconet with a beacon. Additionally, the PNC manages the quality of service (QoS) requirements, power save modes and access control to the piconet. Devices in a piconet can communicate on a peer-to-peer basis.

While it would be desirable to integrate the concept of mesh/relay networks with a wireless cellular network, the addition of a simple and inexpensive backhaul free wireless mesh and relay capability to cellular network operation is not possible without the addition of new, and more complex, network elements as well as significant changes to existing wireless protocols. The inventors have found a way to accomplish that objective in a cost-effective approach, and disclose their invention hereinafter.

An Integrated Mesh/Relay/Radio-Access network according to the invention allows for the use of a single air-interface access protocol over a single, shared air-interface to provide all meshing and relaying functions among the access terminals and base stations of the wireless network while also supporting wireless mobile access.

With the methodology of the invention, the access terminal takes on a dual function. When the access terminal sources (or is the final destination of) the information being communicated over the air between it and a base station, the link is being used for access. When the access terminal is the recipient of the information (from another base station) that it then communicates over the air to a base station, it is performing a mesh/backhaul/relay function using the very same air-interface resources and access protocols.

In order to perform such a function, the access terminal is augmented, according to the invention, with the following capabilities:

- Advertisement by it of its routing capabilities over-the-air to base stations in its vicinity (radio range);

Negotiation between it and the base station on the duration and Quality of Service (bandwidth offered, latency) of the routing service;

Transfer of IP layer data streams received on one downlink to another uplink;

Maintain radio connectivity, i.e. ability to send and receive packets reliably, with multiple base stations on both downlink and uplink.

Figure 10:
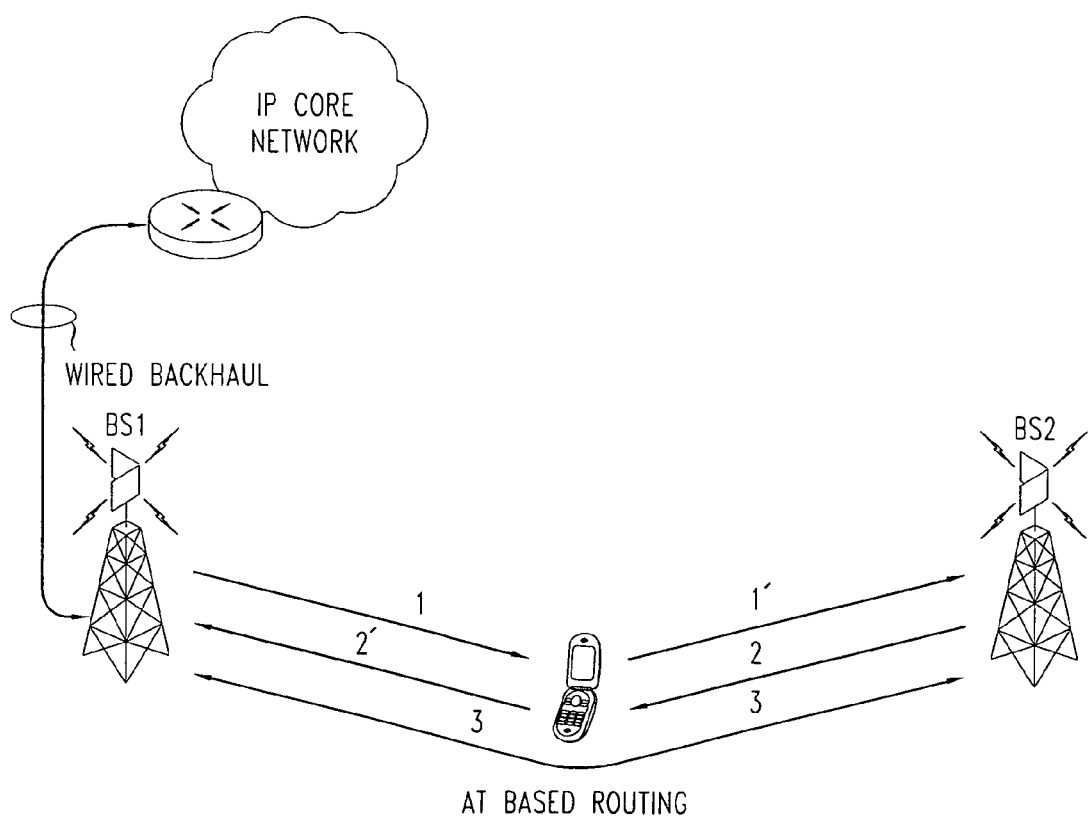
Figure 11:
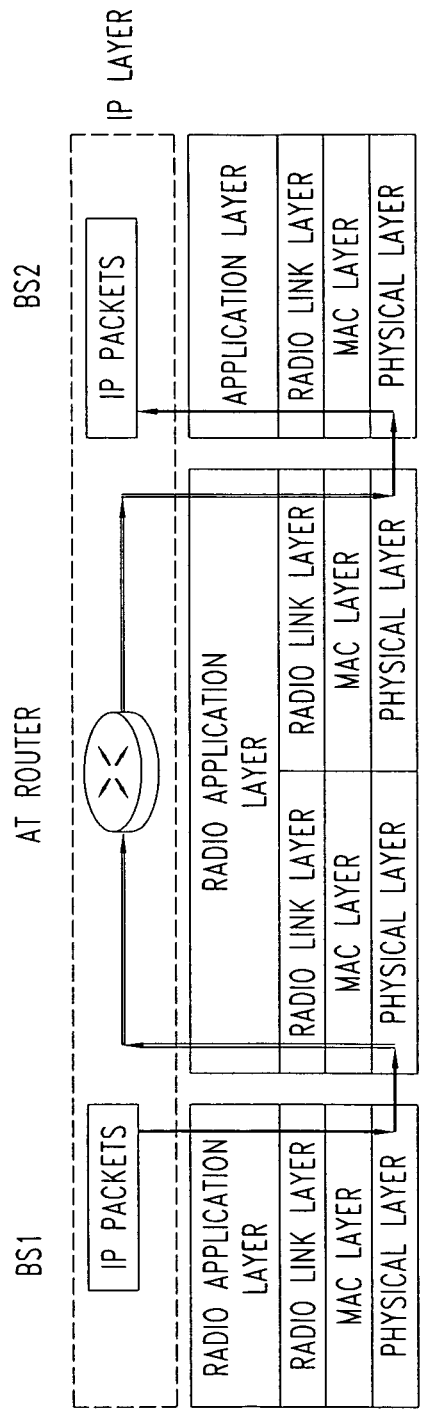
FIG. 11 shows the path traversed along a typical protocol stack in a relay operation according to the invention.

Operation of the access terminal in the relay mode as transferring data/signaling/control information between surrounding base stations is schematically illustrated in FIG. 10. The data stream marked 1,1' is communicated from BS1 to BS2 via the AT Router. Similarly, the data stream marked 2, 2' is communicated from BS2 to BS1 via the AT Router. The bidirectional data stream marked 3 subsumes streams 1, 1', 2, 2' and shows the end-to-end communication path that is being enabled by the AT Router. Similarly, FIG. 11 shows the path traversed along the protocol stack by the information starting from source BS via the routing AT to the destination BS. While the illustrated case is made in the context of the Ultra Mobile Broadband (UMB) air interface (as standardized by 3GPP2 standards development organization) it should be understood that the invention is not in any way limited to this illustrative case and can easily be extended to EVDO standards based on CDMA technology and other OFDMA standards such as LTE and WiMAX.

The air-interface resource set-up and allocation procedures can be done co-operatively by base stations, using the information reported and relayed by the AT router. Another option is a decision process where the resource consumption decisions are made by the AT router itself, based on the resource constraints conveyed by the base stations to the AT router and the router's own constraints.

Figure 12:
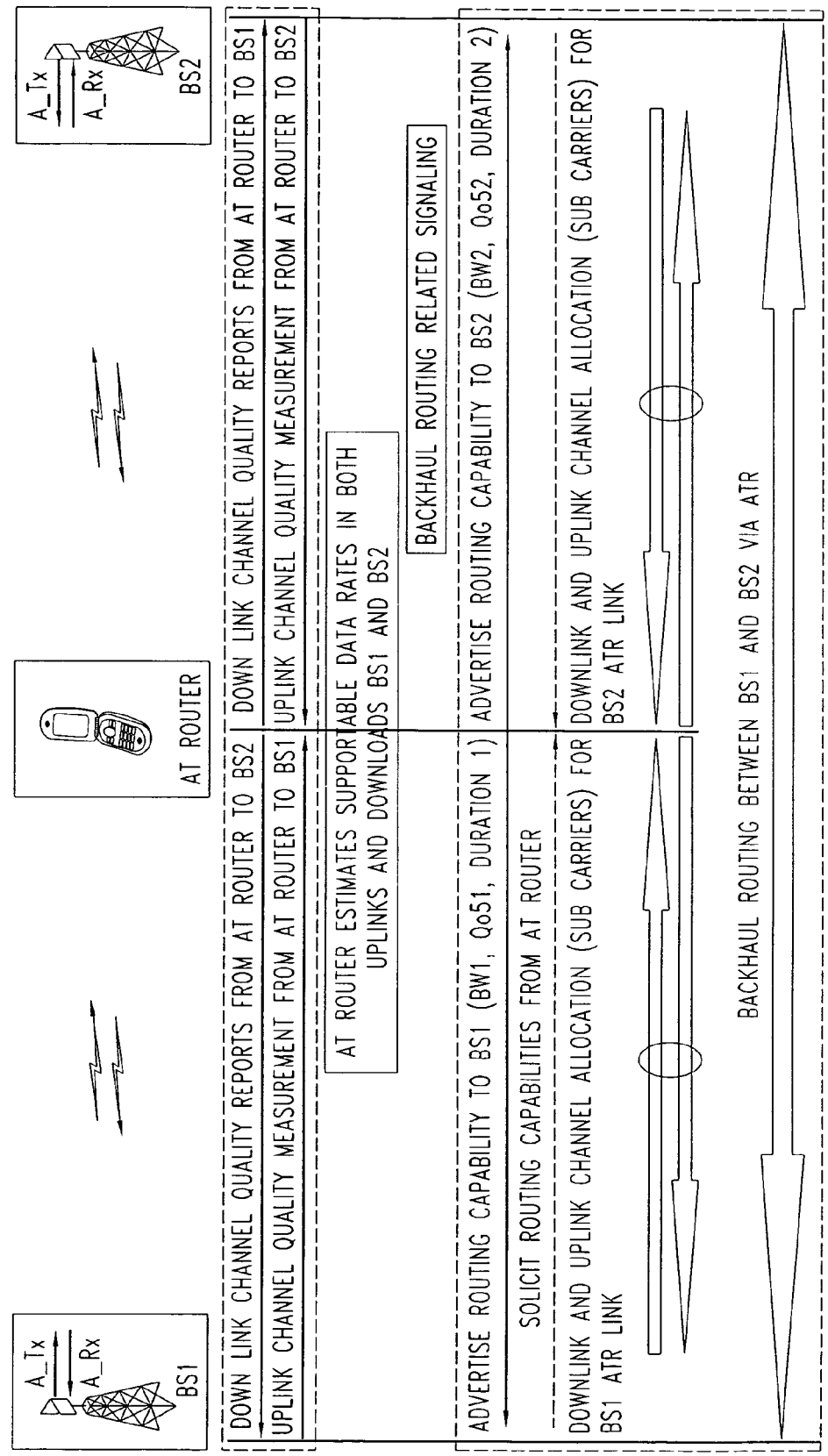
FIG. 12 illustrates, schematically and functionally, the underlying air-interface links and a high level information exchange between the AT routers and communicating base stations in the method of the invention.

For perspective, the set up of the underlying air-interface links between the AT routers and BSs are here briefly described. The communicating units, and the interactions among them, are schematically and functionally illustrated in the upper portion of the boxed call flow shown in FIG. 12 (communicating units and "normal operation" signaling). Again, the description is the context of the UMB air interface, and should be understood as illustrative only, without limiting the scope of the invention. Key steps in the setup of the AT-BS links are:

The AT Router monitors the downlink pilot channels from base stations in its vicinity to track the downlink channel from each of these base stations to itself and reports channel quality measurements;

The base stations report, over the air, a measure of the received (pilot) signal strength from the AT Router that enables the AT Router to track the quality of its channel to each of these base stations;

The AT Router estimates the supportable data rates on each uplink-downlink channel-pair;

Additional signaling functions specific to the AT routing operation is illustrated in the lower portion of the FIG. 12 ("backhaul routing" signaling). For this case, routing by an AT Router for a base station without a wired link to the core network, the following key steps are carried out:

The BS broadcasts router solicitations to discover AT Routers that can act as routers and forward packets on its behalf towards the intended destination (or the first point of connectivity to the wired network)—this step may precede the initiation of a call to the BS.

AT Routers in the vicinity of this BS advertise their ability to route packets, the BSs between which they are able to route packets, and the supportable data rates to and from these BSs. An AT Router may also advertise autonomously, without a solicitation request.

The BS and AT Router negotiate a duration (lease time) and quality of service (bandwidth, latency) for the provided routing service. When negotiation with the base stations is completed, the AT requests and receives appropriate resource allocations (sub-carriers to be used, transmission times etc) from the base stations to and from which data is being routed;

The MAC and RLC (radio link control) layers ensure reliable reception of packets through H-ARQ RLC re-transmission protocols, respectively.

At end of the "lease time" AT Router ends routing service and releases assigned air-interface resources.

Figure 13:
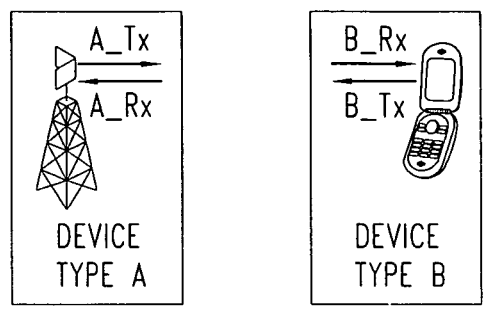
FIG. 13 provides a schematic illustration of the basic network elements for the invention.

Further characteristics of the invention are hereafter described in terms of several exemplary embodiments, beginning with an embodiment characterized by the inventors as a basic network model. The basic network model is one where there are only two device types which can be designated as Dev Type A and the other as Dev Type B. This model is illustrated in FIG. 13.

The network operation for the basic network model is defined by the following rules:

1. Dev Type A operation is complementary to Dev Type B
   a) For example, in a Frequency Division Duplex (FDD) System, the transmit and receive frequencies of these two device types are flipped. In the case illustrated in FIG. 13, transmit frequency A_Tx is equal to receive frequency B_Rx and frequency B_Tx is equal to frequency A_Rx for effective simultaneous transmission and reception to occur.
   b) In Time Division Duplex (TDD), by contrast, a single frequency is used and hence simultaneous transmission and reception cannot take place. Therefore, the transmit and receive time-slots are flipped. Each device must listen while the other is talking for establishing any reasonable communication between them. If both devices attempt to transmit at the same time, a collision occurs and no effective communication takes place. Again referring to FIG. 13, when device type A is transmitting at time-slot A_Tx, the receiver in device type B must listen to it at the same time B_Rx. Similarly, when device type B transmits at time slot B_Tx, then device type A must listen to it at the same time-slot A_Rx.

2. A device type does not communicate directly over the air (i.e. without any intermediate nodes) with another device of the same type.

Key advantages for applying this concept in FDD cellular network systems are

It is much simpler to build out a mesh/relay network with the existing two network elements (i.e. BS and AT) with minimal changes to existing standards or device complexity.

It is expensive to have FDD mesh devices that can serve both as a BS and AT, as considered in the IEEE 802 systems.

The resource allocations in FDD systems are not collision based and hence make more efficient use of spectrum. The BS makes resource decisions based on instantaneous demands and available resources. This allows for dynamic resource sharing between the AT's own communication needs and the need to reserve resources for backhaul.

Using separate IEEE 802 based mesh networks intertwined with cellular networks is operationally difficult to deploy.

Figure 14:
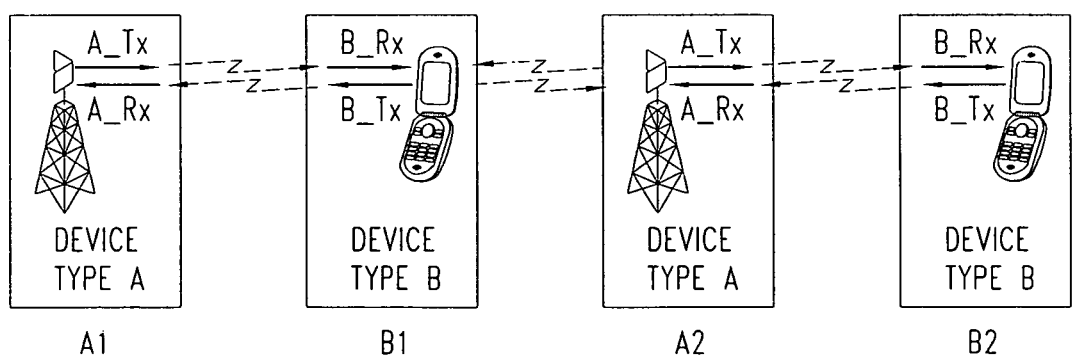
FIG. 14 provides a schematic illustration of an exemplary routing network implemented by the invention

Thus all communications are of the type Dev Type A ⇔ Dev Type B or Dev Type B ⇔ Dev Type A. Two devices of Type A would communicate, for example, via a Dev Type B: Dev Type A (1) ⇔ Dev Type B ⇔ Dev Type A (2). Fundamentally, any type of network—traditional point-to-multipoint cellular networks, mesh or relay—can be devised using just these two types of network elements of opposite Tx/Rx polarity. An exemplary such case is illustrated in FIG. 14.

Figure 15:
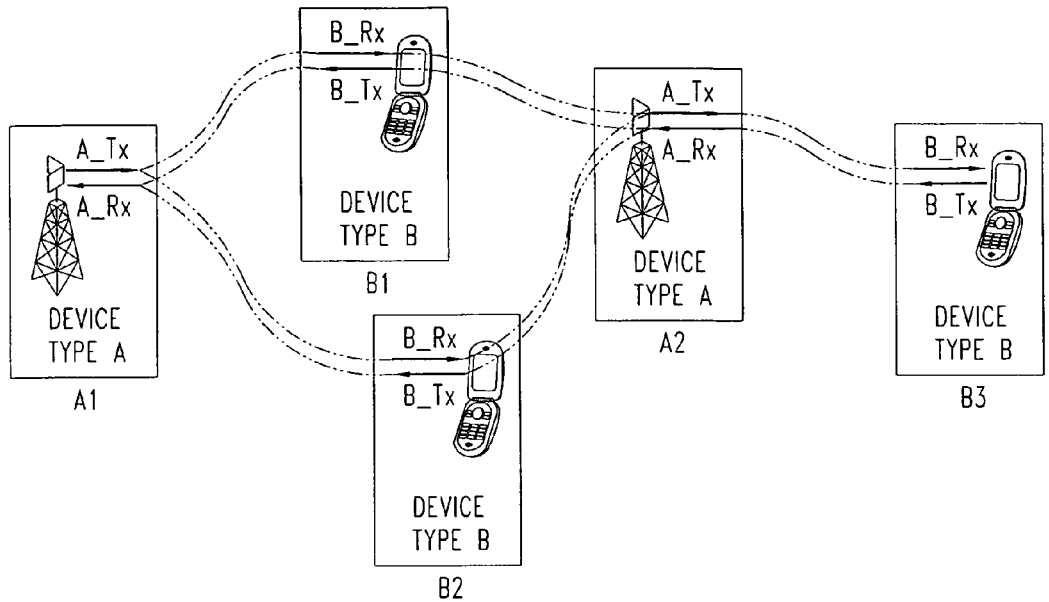
FIG. 15 shows an illustration of an exemplary mesh network capability implemented by the invention.

An illustration of mesh network capabilities is depicted in FIG. 15. The ability to relay or route messages from source base station to destination base station via multiple independent links is shown via the basic network model using Type A (base station), and Type B (Access terminal) devices.

Figure 16:
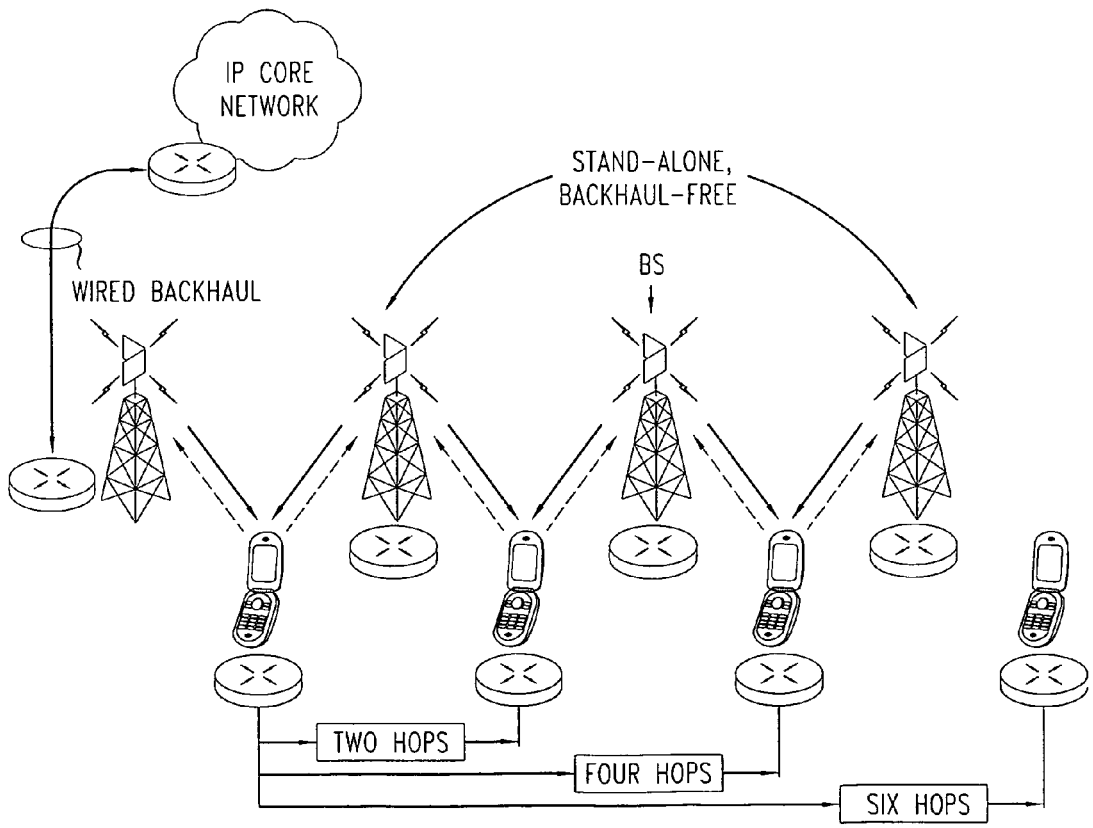
FIG. 16 provides a schematic illustration of another exemplary routing network implemented by the invention FIG. 17 schematically illustrates a network device combining functions of basic Type A and Type B network devices, also termed device Type C.

When mapped to traditional cellular systems, it can readily be seen that this system allows any two base stations to communicate with each other using intermediate ATs and BSs. Also, any two ATs are able to communicate with each other using only the services of intermediate BSs and ATs (i.e. without the use of any wired of specialized wireless backhaul). Such an exemplary routing arrangement is illustrated in FIG. 16.

Figure 17:
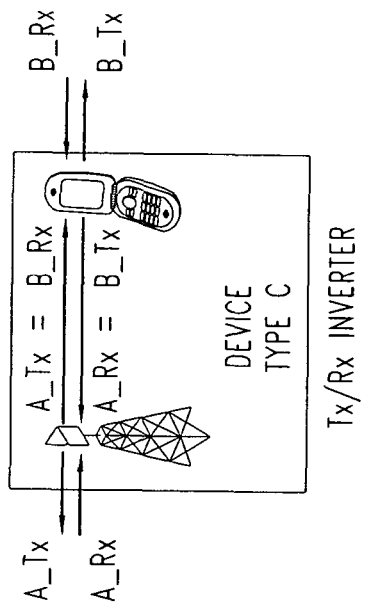
Figure 18:
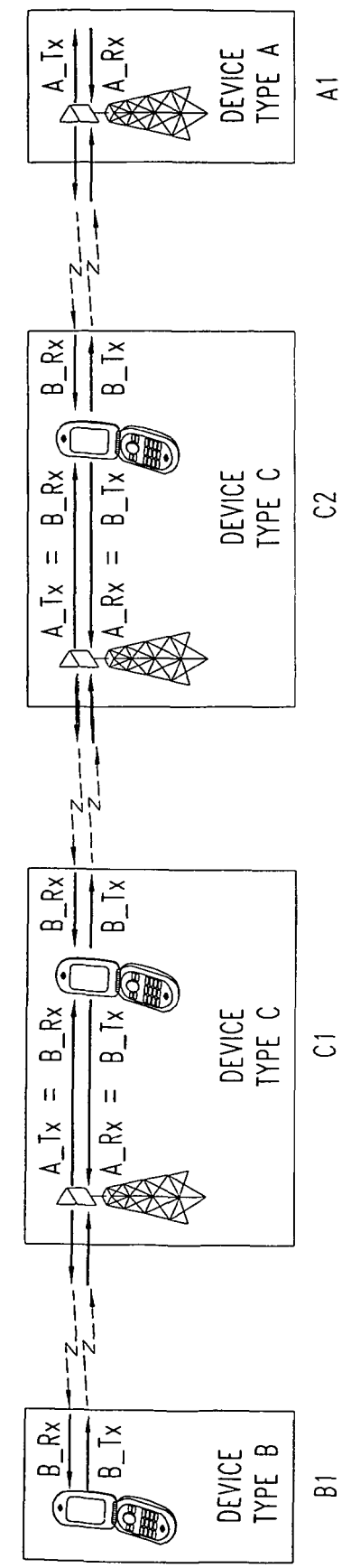
FIG. 18 provides a schematic illustration of a further exemplary routing network implemented by the invention FIG. 19 schematically depicts in-building coverage extension implemented via the methodology of the invention FIG. 20 schematically depicts an exemplary case of range and coverage extension using a single-hop implemented via the methodology of the invention FIG. 21 schematically depicts a further implementation of range extension using Type C device as an intermediate relay via the methodology of the invention FIG. 22 schematically depicts an alternative further implementation of range extension via the methodology of the invention FIG. 23 schematically depicts an exemplary case of temporary communications coverage being provided via the methodology of the invention FIG. 24 provides a schematic depiction of coordination among a macro cell and a pico or femto cell for auto-configuration and RF optimization using the methodology of the invention is applicable

If needed, a Device Type C can be derived by integrating two devices of Type A and B as shown in FIG. 17. The wired interface between Device Types A and B within Device Type C can be the same as the wireless interface. From an external perspective, Devices of either Type A or B can communicate with Dev Type C as shown in FIG. 18. Interference between the constituent device types in Dev Type C can be mitigated by the use of interference cancellation techniques since the information content of the interfering signal is known a priori. In essence, this device acts as a Tx/Rx inverter.

The basic network model of the invention—using combinations of ATs and BSs to provide network connectivity—can be applied in a wide variety of applications, several of which are described below as further embodiments of the invention. It should be understood, however, that the described embodiments are meant only to be exemplary of the utility of the invention, and should not be construed as in any way limiting the scope of the invention usage-models that may be enabled with a combination of BS and AT-Router. A few of the categories are listed below:

A. Range or Coverage Extension

A relay and mesh network established among wireless access terminals and base stations is readily applied to the provision of range and coverage extension functions. Two important applications of such functions are described below as further invention embodiments.

In-Building Coverage Extension

Figure 19:
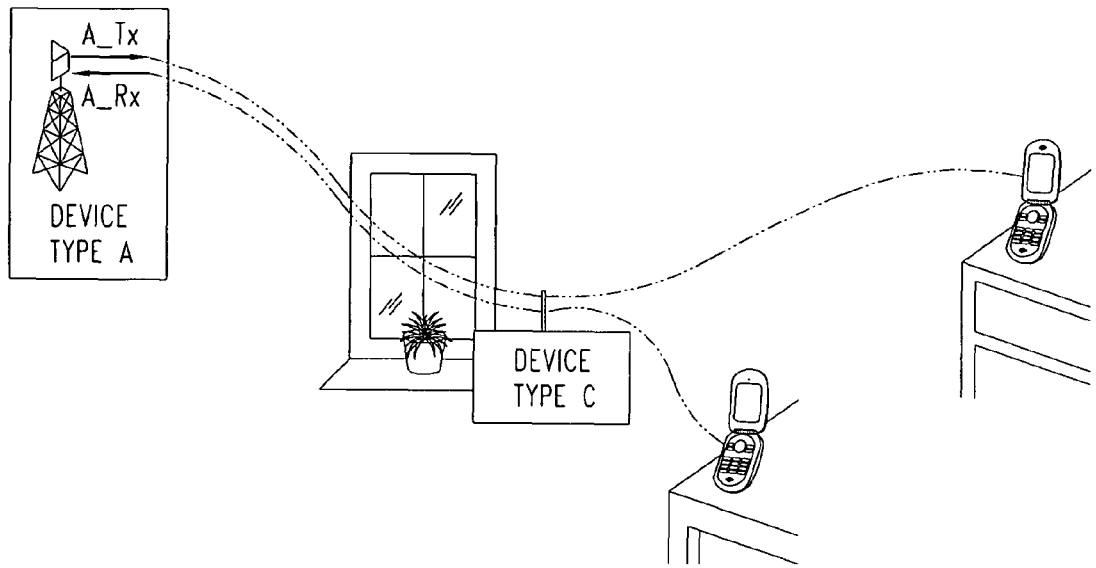

FIG. 19 shows a device type C being used to provide backhaul free coverage inside a home. By placing such devices strategically, in-house or in-building coverage can be provided using the AT routing function of the invention. An important advantage is that the same mobile and protocol can be used both inside and outside the building.

Fixed Infrastructure Coverage Extension

Figure 20:
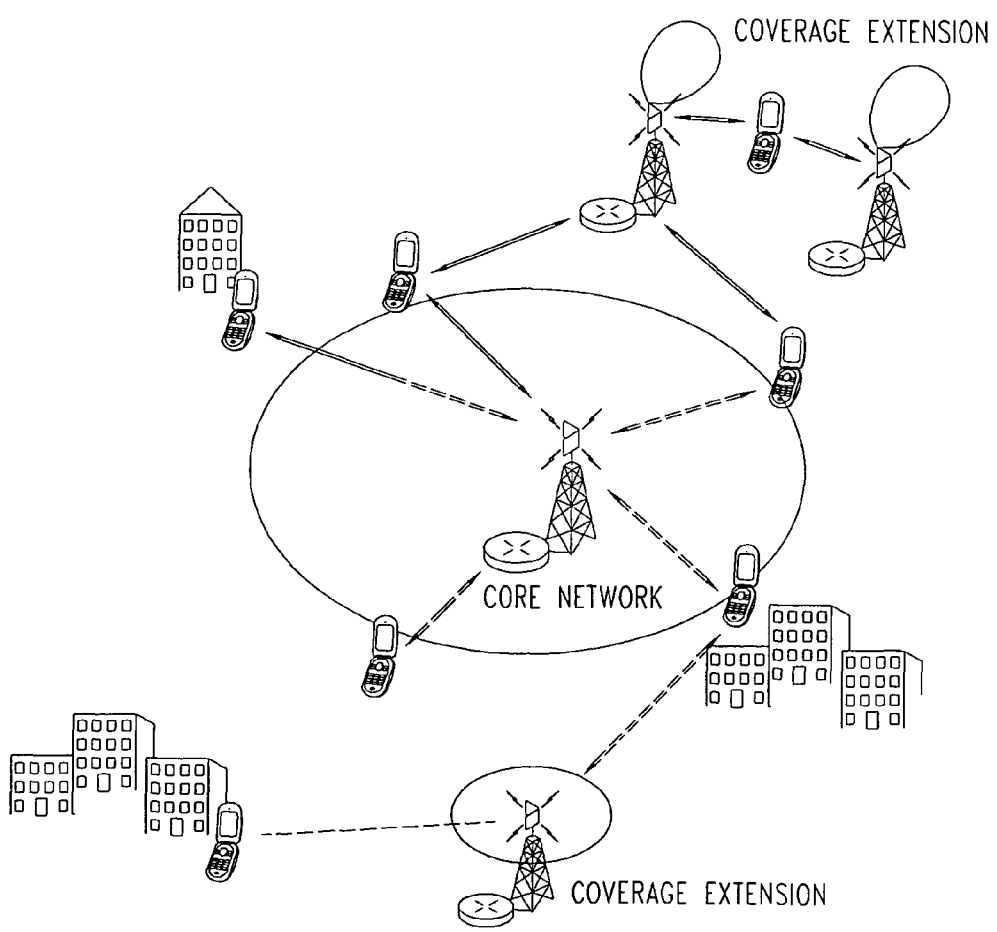

A particularly important application of the AT routing methodology of the invention is the case of providing range extension using a base station peripheral to the core wireless network, where the provision of a dedicated backhaul for the BS would be difficult to implement and or prohibitively expensive. An exemplary infrastructure relay for coverage extension is illustrated in FIG. 20.

Figure 21:
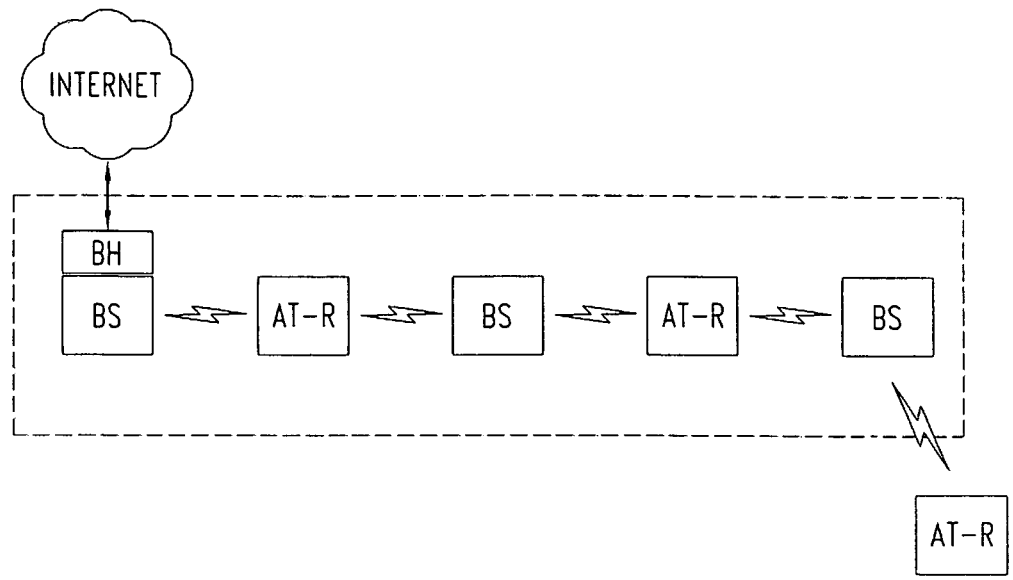
Figure 22:
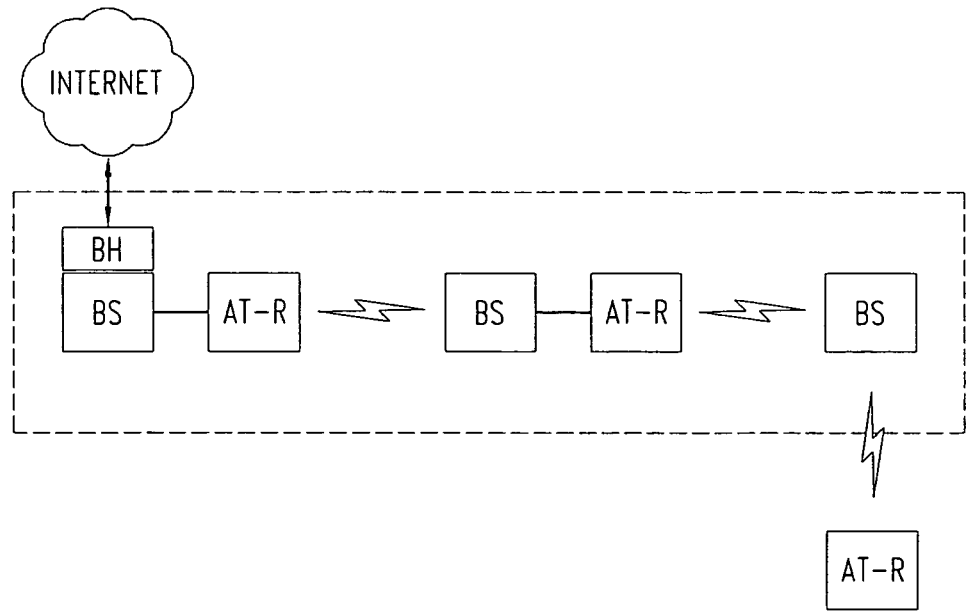

Two implementation options exist for coverage extension depending on whether the two base stations being connected via the AT Router have line-of-sight (LOS) or non line-of-sight (NLOS) signal paths between them. Completely wireless connections between BSs and AT-Routers are depicted in FIG. 21. This option is useful when BS's do not have line-of-sight (LOS) transmission. A co-located, and possibly wired together, BS and AT-Router combination (referred to previously as Type C device) that provides a link between relay stations is illustrated in FIG. 22. This option is useful when LOS conditions do present themselves during deployment.

Temporary Spot Coverage: Emergencies and Special Events

Figure 23:
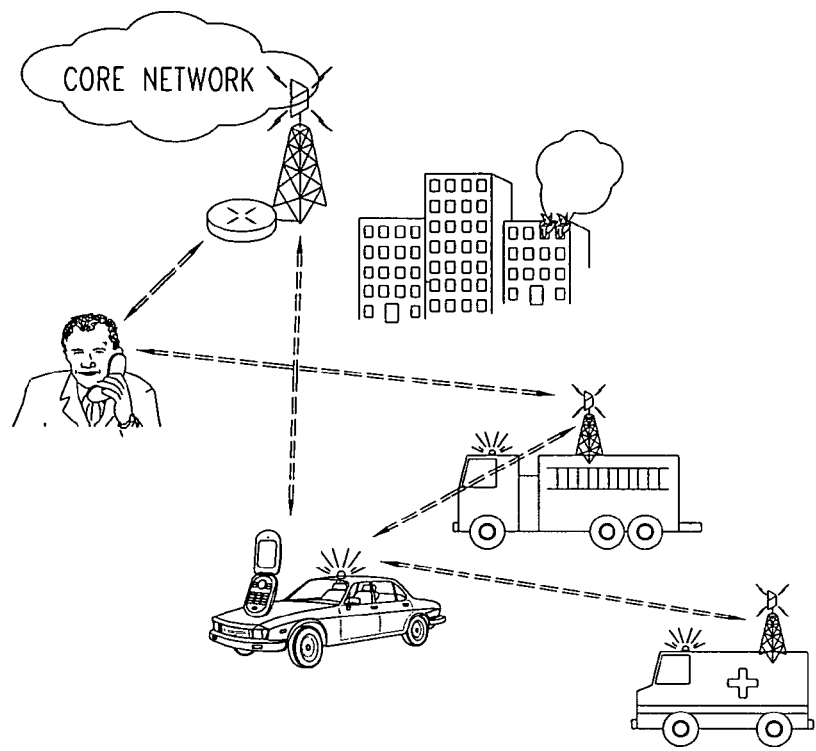

The AT Router methodology of the invention also can be applied for establishing communication coverage for temporary communication requirements, such as emergency and special event communications coverage. This case is illustrated in FIG. 23, which shows a combination of BSs, mounted on vehicles, and AT-Routers being used to set up quick network coverage for an emergency requiring communications among disparate units and or services. Similar methods can be adopted for special locations and events like sports meets, conventions etc which are infrequent and do not warrant permanent and expensive fixed assets.

B. RF Configuration and Optimization

Femto and Pico Cell Management

Figure 24:
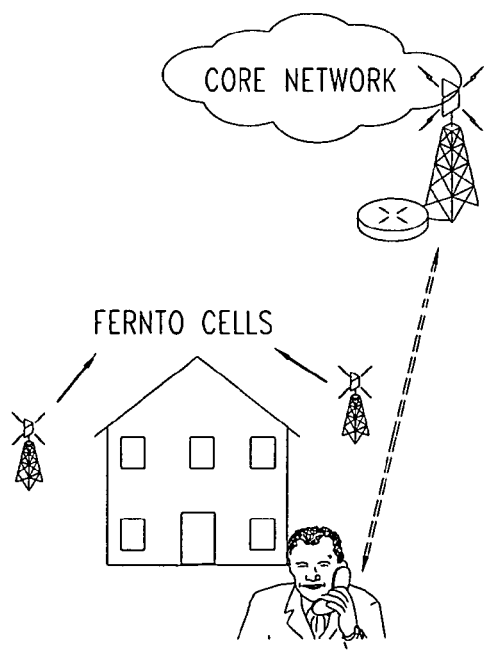

As millions of pico and femto cells get deployed, configuration and optimization of pico and femto cells will be a major burden of service providers and end users alike. The various combinations of RF interactions, i.e. macro-to-pico, macro-femto, femto-femto, pico-femto etc. need to be managed efficiently with minimal technician and end-user effort. A typical case of a macro cell BS, with large coverage area, overlapping with a femto cell BS—a very low power home coverage area—is shown in FIG. 24. Minimizing interference to macro cells and optimizing femto/pico coverage can be time-consuming, especially if they happen to be on the same RF carrier. A mechanism that allows for a simple macro-cell base-station to co-ordinate the configuration and optimization with the femto/pico cell would be highly beneficial.

The AT-Router methodology of the invention provides exactly such a mechanism. Due to its ability to provide connectivity between a BS and femto/pico cells, the AT Router can readily provide the needed coordination. The AT-Router is used to provide signaling and control for auto-configuring and optimizing the femto cells.

Macro Cellular RF Optimization

A frequently-encountered field issue is the absence of a backhaul during initial base-station installation. Optimization of RF assets requires a subsequent site-visit after a backhaul becomes available, adding to the operational expense.

AT-Routers may also be used for RF optimization when new BS's are being added to the network. The coverage of new BS's or new carriers have to be adjusted in relation to its neighbors. By having the AT-Router communicate simultaneously with two neighboring base-stations, they can cooperate, coordinate and fine tune their RF coverage, handoff and neighbor list parameters easily in real-time.

C. Fault and Performance Management

Wireless networks operators incur large operational expenses (OPEX) to perform many OA&MP activities which include fault and performance management amongst other activities. Faults and degraded network performance contributes to reduced availability and reliability metrics. Availability, reliability, time-to-respond during emergencies and faults, and associated operational expense, are accordingly key concerns for service providers and network operators.

During certain class of fault conditions, as when heartbeats are lost between a base-station and the network, troubleshooting and fault isolation becomes a significant problem.

Generally, this can only be accomplished by sending a technician out to the cell site, which may often require significant time, effort and expense.

The AT router of the invention provides a cost effective alternative for fault and performance monitoring. The ability to monitor service coverage and quality in real time provided by the AT Router can be a key competitive advantage to service providers.

Two possible deployment scenarios are contemplated: (1) a fixed infrastructure case and (2) a mobile case.

Figure 25:
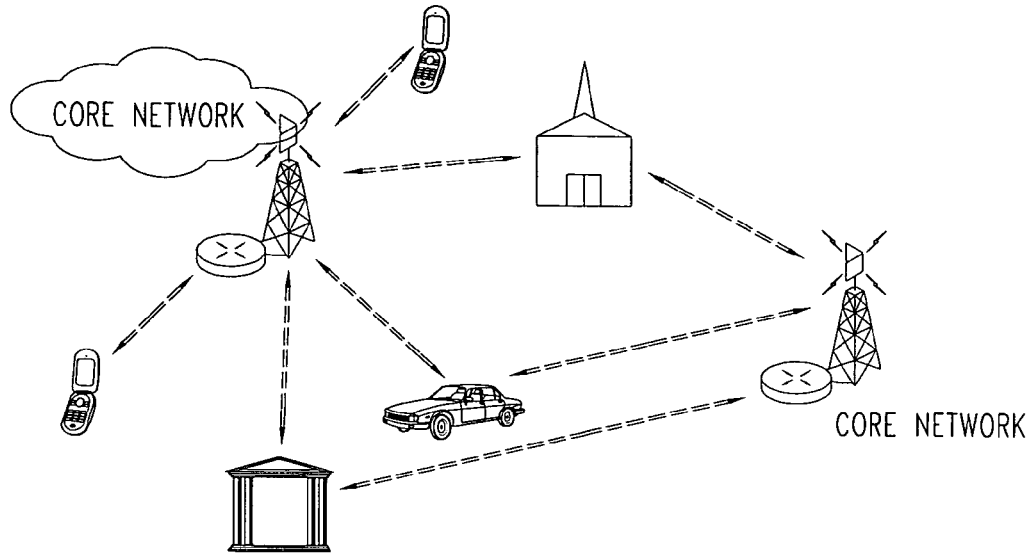
FIG. 25 illustrates fault/performance management functions using the methodology of the invention in a fixed infrastructure case

The fixed infrastructure case contemplates AT-routers owned by service providers that are placed in strategic locations for the purpose of RF network monitoring, surveillance, reporting measurements and alarms. These fixed AT-Routers can be programmed to act as sensors, either continuously, intermittently or on demand and report back key AT measured performance indicators. An illustration of an exemplary fixed infrastructure arrangement is shown in FIG. 25. One option for this case is to use mobile AT-Routers to report observations and also be used as a conduit to trouble-shoot malfunctioning base stations.

Figure 26:
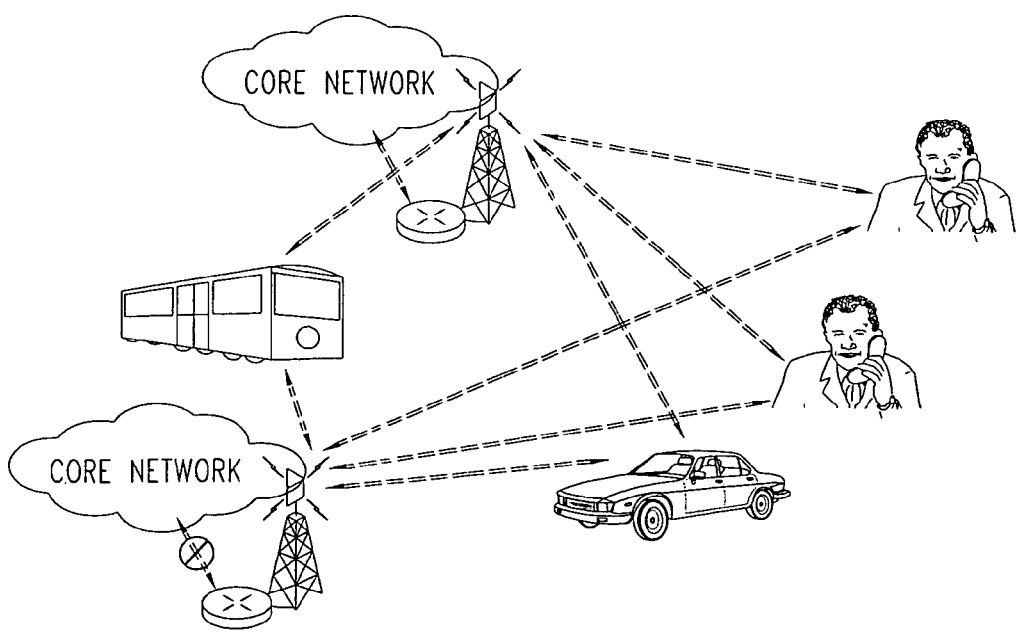
FIG. 26 illustrates fault/performance management using the methodology of the invention in a mobile case

The mobile case contemplates AT routers that are highly mobile and the duration of routing capability is short. Such highly mobile ATs may be used for short request-response and querying type of operations which result in a few kilobytes of data transfer at each instance. An illustration of an exemplary mobile arrangement is shown in FIG. 26. In an illustrative application, a message may be sent to a basestation to run specific self-diagnostic tests and respond with results. This may only require a few messages and a small amount of data transfer. One could also achieve higher data throughputs by using several ATs in the vicinity, either in parallel or sequentially.

In yet another embodiment of the invention, which the inventors have designated as a service model, the AT Router methodology of the invention is extended to subscriber owned and operated ATs. As should be clear from the foregoing description of the invention, in order to make use of an AT to provide the described routing services (and enable base station meshing/backhaul), the AT is leveraging its favorable location, i.e. the fact that its current location enables it to transmit and receive packets reliability between a set of base stations.

Frequently such locations may be subscribers' residences or work places, i.e. locations that would not generally be accessible to a service provider for installing additional base stations to extend coverage. In effect, then, the AT owner/subscriber may be in a position to use its AT for providing a routing service to the network operator or service provider. The service model embodiment of the invention is directed to a means by which the consumer is compensated by the service provider for providing connectivity services to the service provider. The compensation could include payments or credits towards future use of wireless access service.

Compensation to the consumer can be negotiated either as part of his service contract (i.e. corresponding to the duration of time the AT is at the customer's residence and therefore available as a router) or during the actual time that the routing service is provided. In the latter case, ATs can either advertise their rates for routing or base stations can indicate the offered rates for routing, with a willing AT and a willing BS agreeing to accept offered or negotiated terms for a given routing application/duration.

Herein, the inventors have disclosed a method and system for implementing mesh/relay connectivity in a cellular wireless communications system be use of an access terminal router. Numerous modifications and alternative embodiments of the invention will be apparent to those skilled in the art in view of the foregoing description.

Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention, and that the exclusive use of all modifications which come within the scope of the appended claims is reserved.

The invention claimed is:

1. In a wireless communication system including an access terminal and first and second base stations, a method for the access terminal comprising:
providing the access terminal with an air interface protocol, the air interface protocol including a first mode supporting personal area network-based functions and a second mode supporting radio access network-based functions complimentary with an air interface protocol of the first and second base stations;
providing the access terminal with a capability to operate in an access mode wherein the access terminal is operable to receive a message transmitted by at least one of the base stations and in turn transmit a response message to the transmitting base station;
providing the access terminal with a capability to operate in a backhaul mode wherein the access terminal is operable to receive a message transmitted by the first base station and in turn retransmit the message to the second base station;
triggering the access terminal to switch between access mode and the backhaul mode upon receipt of a signaling message from one of the at least two base stations; and
providing the access terminal with a capability to determine allocation of air interface resources in either access mode or backhaul mode based on a combination of the signaling message and a resource constraint of the access terminal, wherein the resource constraint includes at least one of a pilot signal strength and a channel quality of service to one of the at least two base stations, and wherein determining the allocation of air interface resources includes estimating at least one air interface resource setting in either access mode or backhaul mode.

2. The method of claim 1 including the further step of:
providing at least one of the base stations with a capability to locate and route messages from source to intended destination.

3. The method of claim 1 including the further step of:
providing an enabling protocol to enable access terminals and networks to negotiate and cooperate among one another.

4. The method of claim 1 wherein air-interface resources are dynamically shared between the access and backhaul modes using a single set of device protocols.

5. A system comprising an access terminal established to maintain a concurrent air interface with at least a first base station and a second base station, the access terminal further including:
a capability to operate in an access mode wherein the access terminal is operable to receive a message transmitted by at least one of the first or second base stations and in turn transmit a response message to the transmitting base station;

a capability to operate in a backhaul mode wherein the access terminal is operable to receive a message transmitted by the first base station and in turn retransmit the message to the second base station;

triggering means for triggering the access terminal to switch between the access mode and the backhaul mode upon receipt of a signaling message from one of the first or second base stations; and a capability to determine allocation of air interface resources in either access mode or backhaul mode based on a combination of the signaling message and a resource constraint of the access terminal, wherein the resource constraint includes at least one of a pilot signal strength and a channel quality of service to one of the at least two base stations, and wherein the capability to determine allocation of air interface resources includes a capability to estimate an appropriate allocation of an air interface resource for either an access mode or backhaul mode transmission.

6. The access terminal of claim 5 further established to concurrently receive two or more independent data streams from base stations to which the access terminal is transmitting data.

7. The access terminal of claim 6 wherein the access terminal transmits data received by it on a downlink from one base station via an uplink to another base station.

8. the access terminal of claim 7 further including a selector in the access terminal operative to determine the uplink on which data received on a particular downlink is to be transmitted.

9. The access terminal of claim 7 wherein the data received on a particular downlink is retransmitted on more than one uplink.

10. The access terminal of claim 5 wherein the access terminal is owned and operated by a service provider of a wireless communication system including at least one of the first and second base stations.

11. The access terminal of claim 5 wherein transmissions between a given one of the first or second base stations and the access terminal are Frequency Division Duplexed.

12. The access terminal of claim 5 further including a determination by the access terminal of supportable data rates on each uplink-downlink channel pair based on control signaling transmitted between itself and ones of the first and second base stations.

13. The access terminal of claim 12 wherein the access terminal reports said supportable data rates in response to a solicitation for operation on the backhaul mode by the access terminal.

14. The access terminal of claim 5 established at a given location to provide wireless system coverage extension.

15. The access terminal of claim 5 wherein at least one of the first and second base stations is a Femtocell and the access terminal provides signaling and control for autoconfiguring the Femtocell.

16. The access terminal of claim 5 wherein the access terminal is established to monitor and report measurements and alarms for at least one of the first and second base stations.

\* \* \* \* \*